J. M. McMASTER.
Car Brake and Starter.

No. 98,788.  Patented Jan. 11, 1870.

Witnesses:  Inventor:

United States Patent Office.

J. M. McMASTER, OF ROCHESTER, NEW YORK.

Letters Patent No. 98,788, dated January 11, 1870.

IMPROVEMENT IN CAR-BRAKE AND STARTER.

The Schedule referred to in these Letters Patent and making part of the same.

*To all whom it may concern:*

Be it known that I, J. M. McMASTER, of Rochester, in the county of Monroe, and State of New York, have invented certain new and useful Improvements in Car-Brakes and Starters; and I do hereby declare that the following is a full, clear, and exact description thereof, reference being had to the accompanying drawing, making part of this specification, in which—

Figure 1:
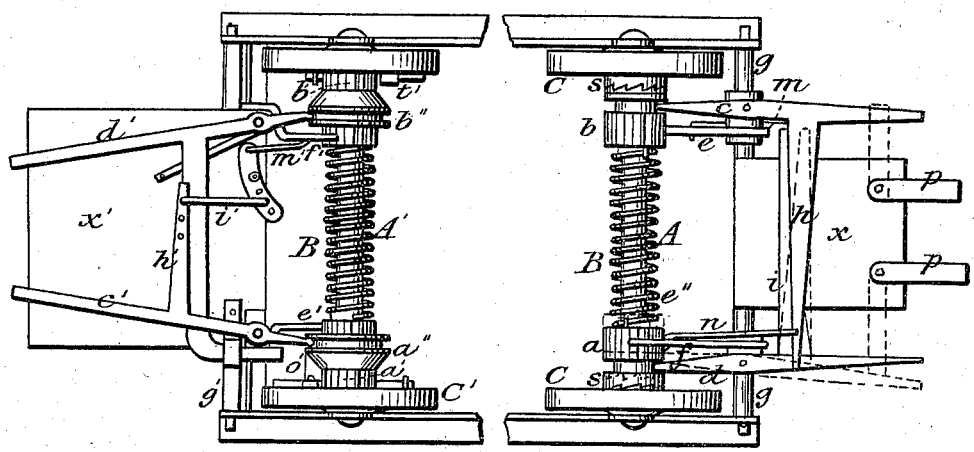
Figure 2:
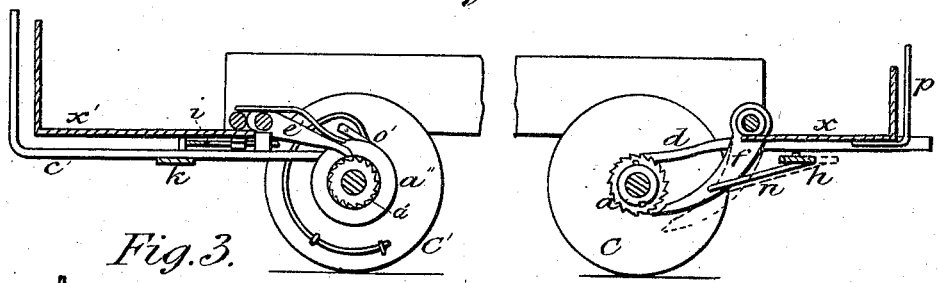
Figure 3:
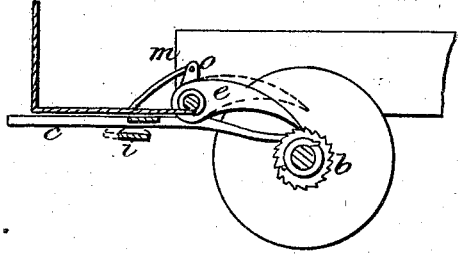
Figure 4:
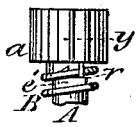

Figure 1 is an inverted plan view of my invention.
Figure 2 is a vertical longitudinal section.
Figures 3 and 4 are details.

The object of my invention, the nature of which will be understood by reference to the specification and drawings, is to store up the power used in stopping a car, and utilize the same in putting it in motion; and, to enable others to make and use my invention, I will describe its construction and operation.

Upon the carrying-axle A of an ordinary car, I provide the coiled spring B, fastened securely, at each end, to the compound ratchets $a$ and $b$, which are fitted loosely to the axle A, near the wheels C.

These ratchets are each composed of a crown and a spur-ratchet, the teeth of the crown-portion fitting into corresponding ratchets, $s$ and $s'$, secured either to the wheels C, or the axle A.

The teeth of ratchet $a$ are inclined in an opposite direction to those of $b$, and the teeth of the ratchets $s$ and $s'$ are similarly arranged with reference to each other.

The pawls $e$ and $f$ hold or release the ratchets $a$ and $b$, $e$ working above, and $f$ below the axle A, and both pivoted to a suitable part of the car-body.

The levers $c$ and $d$, one end of which fit in grooves cut in the periphery of the ratchets $a$ and $b$, are pivoted to the bar $g$, or other convenient part of the car, and are provided with arms, $h$ and $i$, figs. 1, 2, and 3, connected to pawls $e$ and $f$ by links $m$ and $n$.

The arm $i$ is connected, near its end, as shown in fig. 3, by the link $m$, to a spur, $o$, formed upon the pawl $e$.

It is evident, that when the lever $d$ is moved to the position shown in dotted lines in fig. 1, the crown-ratchet upon $a$ will be thrown out of gear, and freed from the axle, and, at the same time, the pawl $e$ is lifted from the ratchet $b$ by means of the arm $i$ and link $m$.

The operation of the lever $c$ is precisely similar with regard to the crown-ratchet upon $b$ and pawl $f$.

The bent levers $p$, pivoted to the platform $x$ of the car, when turned, by the operator, to the position shown in dotted lines in fig. 1, shift and retain levers $c$ and $d$, but when not in use, leave them free, so that the crown-ratchets may be forced into gear by the spring B.

In fig. 1, I have also shown an equivalent arrangement, in which the long spur-ratchets $a'b'$ have annular wedges, $a''b''$, sliding upon them.

The wheels C' are provided with spring-pawls, $o'$ and $t'$, having projecting lips, with inclined inner edges.

The annular wedges lift the pawls $o'$ and $t'$, by means of the levers $c'$ and $d'$, while the latter are also connected to the pawls $e'$ and $f'$ by an arrangement of arms and links similar to that above described.

In this device, however, no locking-levers $p$ are required, since the wedges $a''$ and $b''$ retain the position in which they are placed; and a connecting-link is dispensed with, by bending the end of arm $i'$ at right angles, as in figs. 1 and 2, whereby it raises the pawl $e'$, by sliding upon its inclined lower edge, as shown in fig. 2.

The spiral spring B is secured to the ratchets by an arrangement shown in fig. 4.

The end of the spring is driven into a hole in the face of the ratchet, and the first coil, or a portion of it, lies either in a spiral groove cut in the hub, or upon the periphery of the latter, as desired.

At the point where the spring leaves the hub, a notch, $e''$, figs. 1 and 4, is cut in the latter, in such a form that its edge is nearly, or quite, at right angles to the coil of the spring. The coil, thus having a square bearing at this point, is prevented from sliding off the hub, and being broken at the point of attachment, when strained by the action of the brake.

The operation of my invention is as follows:

When it is desired to stop the car, the bent levers $p$ are turned, so as to leave the levers $c$ and $d$ free, whereupon the crown-ratchets upon $a$ and $b$ are forced into gear by the spring B, and, at the same time, the pawls $e$ and $f$ are dropped upon the ratchets.

If the car is moving in a certain direction, the pawl $e$ holds the ratchet $b$, while the ratchet is revolved by the wheels, by means of the crown-ratchet $s'$. If the motion is in the opposite direction, the pawl $f$ holds ratchet $a$, while $b$ is revolved by the wheels, either of which operations coils or winds up the spring B, and checks the motion of the car, while the power accumulated in the spring is held in restraint by the combined action of the ratchets and pawls, to be used in starting again.

When it is desired to start the car in a certain direction, the lever $c$ is shifted by means of one of the bent levers $p$, which throws the crown-ratchet upon $b$ and pawl $f$ out of gear, leaving the spring B, still held at one end by the pawl $e$, to act upon the wheels by means of the crown-ratchet $s'$. A similar operation, in an opposite direction, takes place when the lever $d$ is shifted.

When both crown-ratchets $a$ and $b$ are thrown out, and pawls $e$ and $f$ lifted, the axle A is permitted to revolve in either direction.

Since the ends of levers $c$ and $d$ act upon only one side of the grooves in the ratchets, flanges or collars may be substituted for such grooves.

When descending an incline, the brake may be put in operation to check the speed of the car, after which the power thus accumulated may be used for ascending an adjacent grade, or released, as desired.

What I claim as my invention, and desire to secure by Letters Patent, is—

1. The levers $c$ $d$, provided with arms $h$ and $i$, in combination with ratchets $a$ $b$ and pawls $e$ $f$, as and for the purposes set forth.

2. The pivoted levers $p$, or their equivalents, in combination with levers $c$ $d$, as and for the purposes set forth.

3. The projecting hub $r$, on the ratchets $a$ $b$, when provided with a spiral groove and the notch $e''$, in combination with the spring B, as and for the purposes hereinbefore set forth.

J. M. McMASTER.

Witnesses:
WM. S. LOUGHBOROUGH,
F. H. CLEMENT.